Feb. 27, 1945. J. H. DORAN 2,370,526
HYDRAULIC TORQUE TRANSMISSION ARRANGEMENT
Filed Feb. 20, 1942
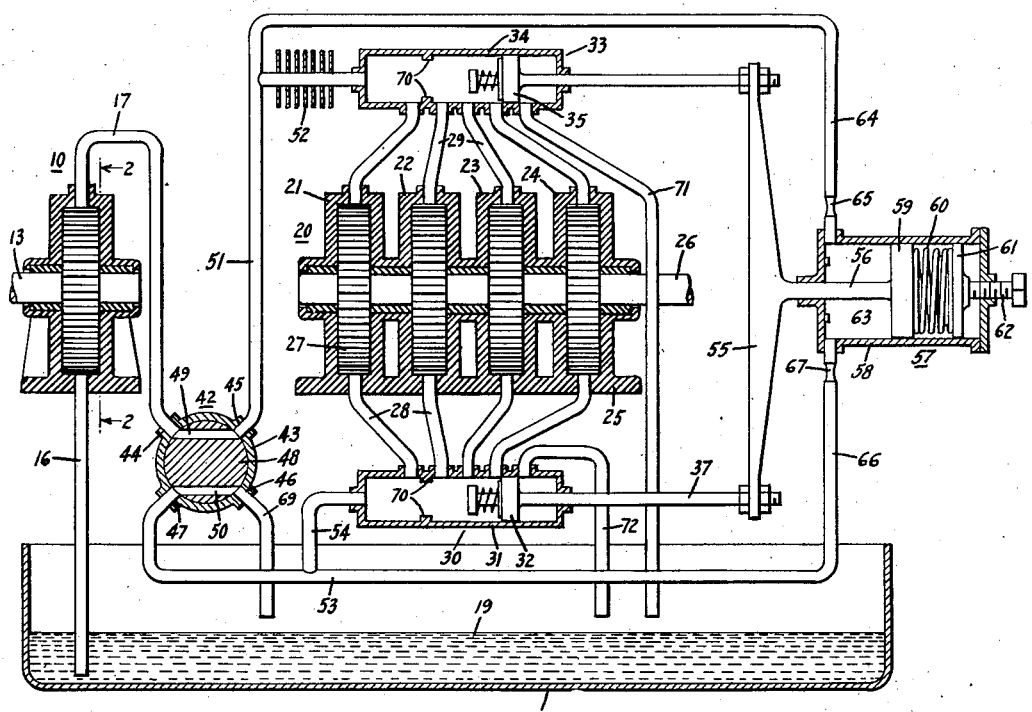
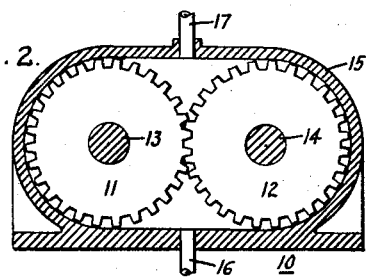
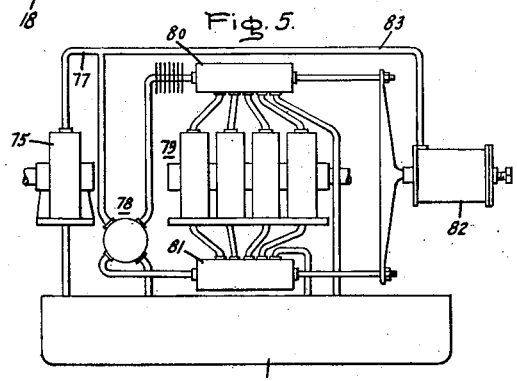
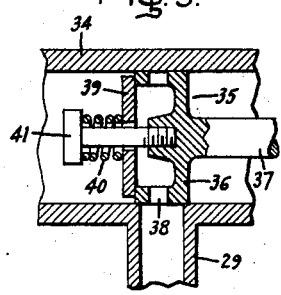
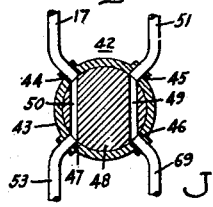
Inventor:
John H. Doran,
by Harry E. Dunham
His Attorney.

Patented Feb. 27, 1945

UNITED STATES PATENT OFFICE 2,370,526

HYDRAULIC TORQUE TRANSMISSION ARRANGEMENT

John H. Doran, Scotia, N. Y., assignor to General Electric Company, a corporation of New York Application February 20, 1942, Serial No. 431,742

1 Claim. (Cl. 60—53)

The present invention relates to hydraulic torque transmission arrangements, particularly to the kind of arrangements which at times are to operate as hydraulic couplings and at other times as hydraulic torque converters. The invention is of particular interest in connection with vehicles, tools and like machinery in which torque is to be transmitted from a drive shaft to a driven shaft.

The object of my invention is to provide an improved construction of hydraulic torque transmission arrangements which is simple in design and may be operated at relatively high efficiency within a wide range of torque and speed.

For a consideration of what I believe to be novel and my invention, attention is directed to the following description and the claim appended thereto in connection with the accompanying drawing.

In the drawing Fig. 1 ilustrates a torque transmission arrangement embodying my invention; Fig. 2 is a section along line 2—2 of Fig. 1; Fig. 3 is an enlarged detail view of a part of Fig. 1; Fig. 4 illustrates a part of Fig. 1 in a different operating position, and Fig. 5 is a modification according to my invention.

The transmission according to my invention broadly includes a pump preferably of the positive displacement type connected to a drive shaft for supplying fluid under pressure to a plurality of parallel-connected hydraulic motors, preferably of the positive displacement type, and having elements connected to a driven shaft. The arrangement includes valve mechanisms for automatically connecting and disconnecting some of the motors in response to changes of an operating condition together with valve means for reversing the direction of rotation of the motors. In the arrangement illustrated in the drawing I have shown a hydraulic pump 10 of the positive displacement type, in the present instance a gear pump (Fig. 2) having two gears 11 and 12 meshing with each other and supported on shafts 13 and 14 respectively. The gears are enclosed within a casing 15 having an inlet conduit 16 and an outlet 17 for operating fluid. One of the shafts, in the present instance the shaft 13, is extended through the casing for connection to a power agency such as a combustion engine or the like, not shown. The inlet conduit 16 extends into a container or sump 18 for operating liquid such as oil 19.

The discharge conduit 17 of the pump 10 is connected to a plurality of hydraulic motors 20. In the present instance I have shown four such motors 21, 22, 23 and 24. The construction of the motors is similar to the construction of the pump 10. They form a unitary structure with a casing 25 and a driven shaft 26 to which one of two gears 27 of each motor is secured. Opposite casing portions of each motor have first and second openings or ports connected to conduits 28 and 29 forming inlets and outlets for operating fluid. In case the fluid is supplied through the conduit 28 the motors run in a certain direction of rotation and the fluid is discharged through the conduits 29. Vice-versa, if the fluid under pressure is supplied through the conduits 29 the motors run in the opposite direction of rotation and the conduits 28 form outlets for the operating fluid. The conduits 28 are connected to spaced portions of a control valve means 30 which comprises a cylinder 31 having spaced portions connected to the conduits 28 and a piston or movable valve member 32 movably disposed within the cylinder 31. Similarly, the conduits 29 are connected to a control valve means 33 comprising a cylinder 34 having spaced portions connected to the conduits 29 and a movable valve member or piston 35 slidably disposed within the cylinder 34.

The piston 35, as shown more clearly in Fig. 3, comprises a hollow piston member or cylindrical member 36 with a bottom portion integrally secured to a stem 37 and a wall forming openings 38. The left-hand portion of the cylindrical member 36 is closed by a plate 39 biased towards the cylinder 36 by means of a compression spring 40 held between the plate 39 and an abutment 41 secured to and broadly forming an extension of the stem 37. In a certain position, as indicated in Fig. 3, the openings 38 register with the conduits 29 to permit the discharge of fluid under pressure from the conduits 29 through the ports or openings 38 into the cylinder 34. Broadly the spring-biased plate 39 constitutes a check or pressure relief valve for relieving fluid under pressure from the cylindrical member 36 whenever such member is in a position in which its ports 38 register with one of the cylinder ports to which a motor discharge conduit is connected.

As pointed out before, the arrangement is for operation in both directions of rotation. Accordingly either of the valve mechanisms 30 and 33 may be connected to the motor 10 or the sump. To this end a reversing valve 42 is provided which comprises a stationary casing 43 with four ports 44, 45, 46 and 47. A rotatable valve member 48 is disposed within the casing and has two channels or passages 49 and 50. In the position shown in Fig. 1 the channel 49 connects the ports 44, 45 and the channel 50 connects the ports 46, 47. Upon clockwise turning of the valve member 48 into the position shown in Fig. 4, the channel 49 connects the ports 45, 46 and the channel 50 connects the ports 44, 47.

The discharge conduit 17 of the pump 10 is connected to the port 44 while the port 45 is connected by a conduit 51 through a heat exchanger or cooler 52 to the cylinder 34 of the valve mechanism 33. The port 47 is connected by a conduit 53 and a branch 54 to the cylinder 31 of the valve mechanism 30. The control valve mechanisms 30 and 33 are automatically controlled in response to changes of certain operating conditions. To this end the stems 37 of the mechanisms are connected to the ends of a lever 55 which has a central portion secured to a stem 56. The latter forms part of a hydraulic motor or pressure responsive device 57 having a cylinder 58 and a piston 59 movably disposed in the cylinder and secured to the righthand end of the stem 56. The piston 59 is biased towards the left by a compression spring 60 held between the piston 59 and a spring plate 61 adjustably supported on a bolt 62. The piston 59 and the cylinder form a pressure chamber 63 connected by a conduit 64 with a restriction or reduced portion 65 to the aforementioned conduit 51 and by another conduit 66 with a restriction or reduced portion 67 to the aforementioned conduit 53.

The operation of the mechanism is as follows: Assuming that the shaft 13 of the pump 10 is driven by a suitable power agency and the shaft 26 of the motors is connected to drive a vehicle or like machine subject to varying load conditions, operating liquid then is conducted from the tank or reservoir 18 through the inlet conduit 16 to the pump 10 and discharged therefrom under pressure through the conduit 17, the channel 49 of the reversing valve 42, the conduit 51 and the heat exchanger 52 to the cylinder 34 of the control valve mechanism 33. The operating fluid such as oil is conducted from the cylinder 34 through the conduits 29 which in this instance form inlet or supply conduits into the motors 21, 22, 23 and 24. Assuming that the gears of the motors 21 to 24 are stationary, as is the case during starting, a high pressure is built up in the pressure chamber 63. Fluid under pressure is supplied to the latter from the conduit 51 through the conduit 64. The pressure in the chamber 63 forces the piston 59 towards the right thus moving the pistons 35 and 32 of the valve mechanisms 33 and 30 respectively into the righthand end positions, thus assuring that the inlet conduits 29 of all motors are connected to receive operating fluid from the cylinder 34. The fluid under pressure causes turning of the gears of the motors 21 to 24 and accordingly of the output shaft 26 and the machine connected thereto. The operating fluid is discharged from the motors through the conduits 28 which then form outlet conduits into the cylinder 31 of the valve mechanism 30, whence the fluid flows through the branch conduit 54, the conduit 53 and the channel 50 of the reversing valve 42 through the port 46 into a drain conduit 69 connected to the reservoir or tank 18.

The operating fluid on its passage through the fluid circuit described above is cooled in the surface type heat exchanger 52. The movable valve members of the mechanisms 30 and 33 being rigidly secured to the lever 55 are always in the same relative positions with respect to each other.

In the position shown, the valve mechanisms permit the operation of all four motors of the unit 20, permitting the creation of high torque at relatively low speed which is important during starting of and sudden high load demand on the output shaft 26.

Upon starting and rotation of the gears of the motors 21 to 24 the resistance to flow of fluid through the motor decreases. Accordingly the pressure in the cylinder 34 and the conduit 51 drops. A similar pressure drop is created in the pressure chamber 63 through its connection to the conduit 51 whereby the compression spring 60 forces the piston 59 towards the left until equilibrium is reached. This causes the valve members 35 and 32 of the mechanisms 33 and 30 respectively to move towards the left and to disconnect successively the inlets and outlets of some of the motors. At first the inlet conduit 29 and the outlet conduit 28 of the motor 24 are disconnected, then the inlet and outlet conduits 28, 29 of the motor 23, and finally the inlet and outlet conduits 28, 29 of the motor 22 are disconnected so that ultimately the conduit 29 of the motor 21 only receives high pressure fluid from the cylinder 34. To prevent disconnecting of the conduits 29 and 28 of the motor 21 from the cylinders 34 and 31 respectively, stops 70 are provided within the cylinders 34 and 31 for engaging the cylindrical members 36 in their lefthand end positions. Thus, with the arrangement described above the number of a plurality of hydraulic motors is automatically varied in response to variations of torque and speed. As the speed of the motor unit increases all except one of the motors are successively disconnected or placed out of operation. While no operating fluid is supplied to some of the motors their gears continue to run idle. During this idling condition it is important to prevent locking of any one of the motors, that is, to assure draining of fluid therefrom and to prevent the building up of excessive pressure due to presence of operating fluid within any one of the motors. This is accomplished by the provision of the special design of the movable valve members 35 of the valve mechanisms 30 and 33 described above. These movable members permit draining of fluid from any motor while idling. Assuming in Fig. 3 fluid under pressure in the conduit 29 were built up, the fluid pressure through the port 38 forces the plate 39 towards the left against the biasing force of the spring 40, thus permitting draining of fluid and preventing the building up of excessive pressure within the conduit 29 in a position in which the cylinder 36 covers completely the port connection to the particular conduit 29. Thus, in the case described, operating fluid may always be discharged through the conduits 28 and the movable valve member 32, particularly also in any position of the valve member 32 in which it covers completely the port connection to any of the conduits 28 of the motors 22, 23 and 24.

If during operation the torque on the shaft 26 is increased, as may occur when a vehicle has to climb a hill, the speed of the output shaft 26 is reduced. This increases the restriction to flow through the motors then in operation and the building up of pressure in the cylinder 34 and the pressure chamber 63, causing the piston 59 to move towards the right. This effects similar movement towards the right of the movable valve members 35 of the mechanisms 33 and 30 to connect additional motors in parallel with the motor 21 until equilibrium is reached between the force created by the pressure in the chamber 63 and the force of the spring 60.

The righthand end portions of the cylinders 34 and 31 are connected by drain conduits 71 and 72 to the reservoir 18 to drain operating fluid discharged from the motors and leaking past the movable valve members 35 into the righthand end portions of the cylinders 34 and 31 respectively. Upon reversing of the reversing valve 42 into the position indicated in Fig. 4, the operation of the hydraulic torque transmission arrangement is similar to that described above except that the output shaft 26 of the motor unit 20 rotates in reverse direction. The conduits 29 which before acted as supply conduits become discharge conduits and the conduits 28 become supply conduits. Also, during the operation described above the fluid was cooled in the heat exchanger 52 on its flow to the motors while upon reversal of the mechanism the fluid is cooled upon discharge from the motors.

Upon reversal of the reversing valve 42 fluid under pressure is supplied to the pressure chamber 63 from the conduit 17 through the reversing valve 42 and the conduits 53, 66, and fluid is discharged from the chamber 63 through the conduits 64, 51 and the reversing valve 42 through the drain conduit 69 to the tank 18.

An arrangement according to my invention adapts itself readily to load changes, it is equally effective for either direction of rotation, and operates at high efficiency under varying torque and speed conditions.

The modification shown in Fig. 5 comprises hydraulic pump means 75 corresponding to the pump 10 of Fig. 1 and arranged to receive operating liquid from a reservoir 76. The pump means 75 has a discharge conduit 77 connected through a reversing valve 78 to hydraulic motor means 79 corresponding to the hydraulic motors 20 of Fig. 1 and controlled by valve mechanisms 80, 81 actuated by a pressure responsive device or servo motor 82. The arrangement so far described is similar to that shown in Fig. 1. The hydraulic motor 82 is connected by a pipe 83 to the discharge side of the hydraulic pump means 75. The pipe 83 is connected to the discharge conduit 77 ahead of the reversing valve 78, thus permitting the elimination of restrictions such as the restrictions 65 and 67 in the conduits 64 and 66 respectively of Fig. 1 and requiring only a single pipe 83 in place of the two conduits 64, 66 of Fig. 1. The operation of this arrangement otherwise is similar to that of Fig. 1.

What I claim as new and desire to secure by Letters Patent of the United States is:

Hydraulic torque transmission arrangement comprising a gear pump having an inlet conduit for connection to a source of operating liquid and a discharge conduit, a plurality of hydraulic motors each having a first and a second opening for receiving and discharging fluid, separate control valve mechanisms for connecting in parallel the first and second openings respectively, each control valve mechanism comprising a cylinder having a plurality of axially spaced ports connected to said openings and an exhaust port near one end, a hollow piston member wider than the ports to and from said openings being slidably disposed in the cylinder and having a port in its wall and a bottom, a cover plate and means yieldably biasing the plate towards closing position against the open end of the piston member to relieve fluid pressure from any motor whose respective port registers with the piston member, means including a reversing valve for connecting the pump discharge conduit to either of the control valve mechanisms to conduct in one position operating fluid to the first openings and in another position to the second openings, and means including a device for positioning the piston members in response to changes of the pump discharge pressure.

JOHN H. DORAN.